United States Patent
Hattori

(10) Patent No.: US 9,979,265 B2
(45) Date of Patent: May 22, 2018

(54) STATOR, STATOR MANUFACTURING METHOD, AND ROTARY ELECTRIC MACHINE

(71) Applicant: Hiroyuki Hattori, Okazaki (JP)

(72) Inventor: Hiroyuki Hattori, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 184 days.

(21) Appl. No.: 14/761,329

(22) PCT Filed: Jan. 22, 2014

(86) PCT No.: PCT/IB2014/000060
§ 371 (c)(1),
(2) Date: Jul. 16, 2015

(87) PCT Pub. No.: WO2014/115018
PCT Pub. Date: Jul. 31, 2014

(65) Prior Publication Data
US 2015/0364977 A1    Dec. 17, 2015

(30) Foreign Application Priority Data

Jan. 22, 2013  (JP) ................................. 2013-009511
Jan. 10, 2014  (JP) ................................. 2014-003498

(51) Int. Cl.
*H02K 3/38*     (2006.01)
*H02K 15/085*   (2006.01)
*H02K 3/34*     (2006.01)

(52) U.S. Cl.
CPC ............. *H02K 15/085* (2013.01); *H02K 3/34* (2013.01); *H02K 3/38* (2013.01); *Y10T 29/49011* (2015.01)

(58) Field of Classification Search
CPC ............. H02K 15/85; H02K 3/34; H02K 3/38; H02K 3/345; H02K 3/32; H02K 15/10;
(Continued)

(56) References Cited

U.S. PATENT DOCUMENTS 6,285,105  B1 *  9/2001  Asao ........................ H02K 3/28
                                                           310/179
2001/0026109 A1 * 10/2001 Higashino ................ H02K 3/50
                                                           310/201
(Continued)

FOREIGN PATENT DOCUMENTS

EP    1 128 526 A2    8/2001
EP    1 130 743 A2    9/2001
(Continued)

*Primary Examiner* — Michael Andrews
(74) *Attorney, Agent, or Firm* — Sughrue Mion, PLLC

(57) ABSTRACT

A flat wire (36) that forms a stator coil (16) has an insertion portion (22) that is inserted into a slot (14), and a coil end portion (30) that protrudes from an end portion of the stator coil (16). An insulating layer of an adjacent portion (38) that is adjacent to a flat wire (36) of a different phase at the coil end portion (30) is thicker than an insulating layer in another region. Setting the thickness of the insulating layer of each part according to the required insulation performance in this way makes it possible to make the overall insulating layer thinner, and improve the in-slot space factor of the stator coil while ensuring insulation performance.

7 Claims, 8 Drawing Sheets

(58) Field of Classification Search
CPC .............. H02K 15/085; H02K 15/105; Y10T 29/49011
USPC ............................... 310/208, 179, 195–207
See application file for complete search history.

(56) References Cited

U.S. PATENT DOCUMENTS

| | | | |
|---|---|---|---|
| 2008/0231136 A1 | 9/2008 | Obata | |
| 2012/0133235 A1* | 5/2012 | Ogihara | ............... H02K 3/12 310/208 |
| 2014/0300239 A1* | 10/2014 | Takizawa | ............ H02K 3/34 310/208 |

FOREIGN PATENT DOCUMENTS

| | | | | | |
|---|---|---|---|---|---|
| JP | 2004-064989 A | | 2/2004 | | |
| JP | 2008-236924 A | | 10/2008 | | |
| JP | 2009199749 A | * | 9/2009 | ............. | H02K 3/14 |
| JP | 2011-072052 A | | 4/2011 | | |
| JP | 2011-072071 A | | 4/2011 | | |
| JP | 2011072071 A | * | 4/2011 | | |
| JP | 2013-094019 A | | 5/2013 | | |
| WO | WO 2013061904 A1 | * | 5/2013 | ............... | H02K 3/34 |

* cited by examiner

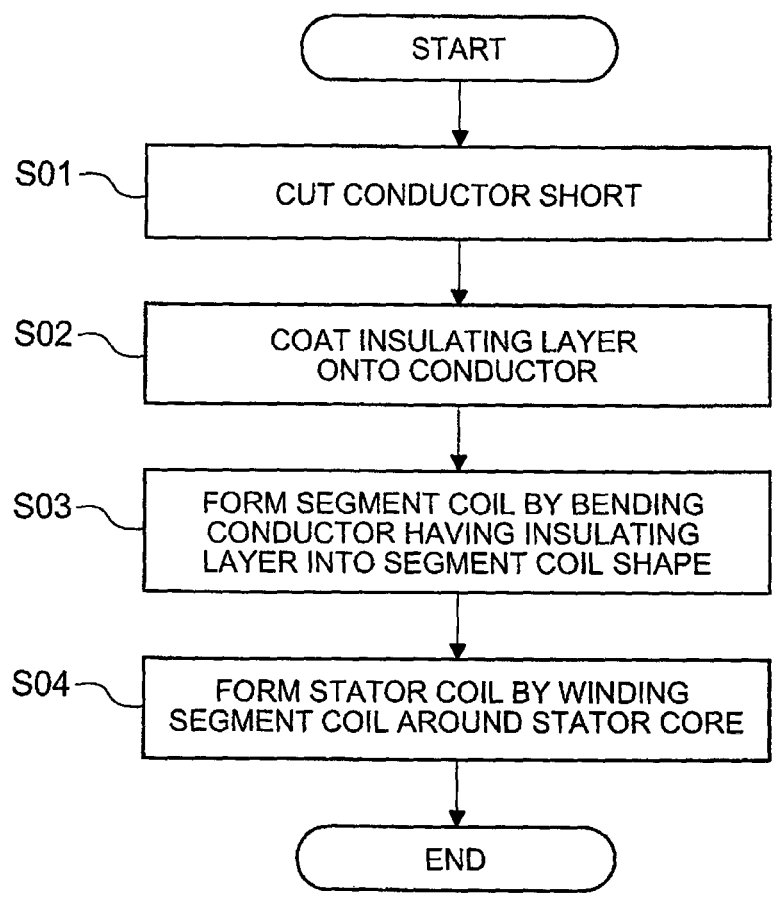

STATOR, STATOR MANUFACTURING METHOD, AND ROTARY ELECTRIC MACHINE

BACKGROUND OF THE INVENTION

1. Field of the Invention

The invention relates to a stator, a manufacturing method of a stator, and a rotary electric machine provided with the stator. More particularly, the invention relates to an improvement of the structure of a conducting wire used in a polyphase stator coil.

2. Description of Related Art

A rotary electric machine includes a stator provided with a stator coil that generates a rotating magnetic field, and a rotor rotatably provided inside the stator. The rotor rotates by electromagnetic action operating between the rotating magnetic field of the stator and the rotor.

One type of conducting wire used for the stator coil described above has a circular cross-section. However, in order to increase the in-slot space factor of the stator coil, a flat wire that is a conducting wire with a rectangular cross-section is sometimes used instead of a conducting wire with a circular cross-section.

Japanese Patent Application Publication No. 2011-72052 (JP 2011-72052 A) describes a stator having a stator core in which slots are formed, and a stator coil formed by a flat wire coated with an insulating layer being wound in a distributed manner in the slots. With the flat wire described in JP 2011-72052 A, the insulating layer on a surface contacting an adjacent flat wire in the radial direction in the slots is thin, so the in-slot space factor of the stator coil is increased. In addition, the insulating layer of the surface that contacts the stator core is thick, so insulation performance is ensured.

Japanese Patent Application Publication No. 2011-72071 (JP 2011-72071 A) describes a stator having a stator core in which slots are formed, and a stator, coil formed by a flat wire coated with an insulated layer being wound in a distributed manner in the slots. With the flat wire described in JP 2011-72071 A, a surface is coated with an insulating layer, and a coil insulating portion is attached to a portion that is adjacent to a different phase coil at the coil end, so interphase insulation is ensured.

The flat wire that is adjacent in the radial direction in the same slot is the same phase, so the insulating layer is able to be made thin as long as it is thick enough to provide insulation performance that prevents a short between these flat wires, i.e., as long as it is thick enough to ensure interphase insulation. However, in a polyphase stator coil formed by the flat wire being wound, flat wires with different phases are adjacent to one another at coil end portions that are exposed from the slots, so the insulating layer of the flat wire must be of a thickness that takes into account the potential difference among phases, i.e., must be thick enough to ensure interphase insulation. Therefore, the entire flat wire is coated with a comparatively thick insulating layer that takes into account a high potential difference among different phases, and this insulating layer thickness ends up impeding improvement of the in-slot space factor of the stator coil, which is problematic. If improvement of the in-slot space factor of the stator coil is limited, a reduction in motor size and improvements in motor output characteristics cannot be expected.

One conceivable way of handling this is to attach a coil insulated portion corresponding to the interphase insulation only to a portion near an area between different-phase flat wires at the coil end, as in JP 2011-72071 A. However, a coil insulating member is a separate member that is different from the flat wire, so even if it is attached, there will end up being a gap between these members, so the insulation performance may end up decreasing. On one hand, if an attempt is made to improve adhesion between the two by eliminating this gap, assemblability in a coil insulating member attaching process may decrease. In addition, during attachment, the insulating layer applied to the flat wire may be damaged by a coil attaching member, and as a result, insulation performance may end up decreasing.

SUMMARY OF THE INVENTION

The invention thus provides a stator capable of improving an in-slot space factor of a stator coil while ensuring insulation performance, a manufacturing method of this stator, and a rotary electric motor provided with this stator.

A first aspect of the invention relates to a stator that includes a stator core in which slots are formed a predetermined distance apart in a circumferential direction, and a polyphase stator coil formed by a first flat wire of a first phase, that is coated with an insulating layer, and a second flat wire of a second phase that differs from the first phase, that is coated with an insulating layer, the polyphase stator coil being wound around the stator core through the slots. The first flat wire and the second flat wire each have an insertion portion that is inserted into the slots, and a coil end portion that protrudes from an end portion of the stator core. A first insulating layer of an adjacent portion of the first flat wire that is adjacent to the second flat wire at the coil end portion of the first flat wire is thicker than a second insulating layer in a region other than the coil end portion of the first flat wire.

Also, the stator coil may be formed by the first flat wire and the second flat wire being wound, in a distributed manner around the stator core.

Also, the stator coil may be formed by a segment coil.

Also, the first insulating layer may be applied when the first flat wire is in a shortened state in which the first flat wire has been cut to a coil segment length.

Also, the first insulating layer may be applied when the first flat wire has been bent into a segment coil shape from a shortened state in which the first flat wire has been cut to a coil segment length.

Also, the first insulating layer of the adjacent portion may be formed by a basic insulating layer that has a uniform thickness of insulation material and is formed over the entire first flat wire, and an insulation-reinforcing insulating layer that has higher insulation performance than the basic insulating layer is added to the basic insulating layer at the coil end portion.

A second aspect of the invention relates to a rotary electric machine that includes a rotor, and the stator described above.

A third aspect of the invention relates to a manufacturing method of a stator having a stator core in which slots are formed a predetermined distance apart in a circumferential direction, and a polyphase stator coil formed by a first segment coil of a first phase, that is coated with an insulating layer, and a second segment coil of a second phase that differs from the first phase, that is coated with an insulating layer, being wound around the stator core through the slots. This manufacturing method includes providing each of the first segment coil and the second segment coil with an insertion portion that is inserted into the slots, and a coil end portion that protrudes from an end portion of the stator core; coating on the coil end portion of the first segment coil with an insulating layer of an adjacent portion of the first segment coil that is adjacent to the second segment coil, such that the insulating layer of the adjacent portion is thicker than an insulating layer in a region other than the adjacent portion; and forming a stator coil by winding the first and second segment coils coated with the insulating layer around the stator core.

Also, the conductor may be made to be in a shortened state by being cut to a coil segment length, the insulating layer may be coated on the conductor in the shortened state, and the conductor coated with the insulating layer may be bent into a segment coil shape to form the first segment coil.

Also, the conductor may be made to be in a shortened state by being cut to a coil segment length, the conductor in the shortened state may be bent into a segment coil shape, and the insulating layer may be applied to the conductor in a state bent into the segment coil shape to form the first segment coil.

The stator and manufacturing method of the stator according to the invention make it possible to improve the in-slot space factor of the stator coil while ensuring insulation performance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8 is a flowchart illustrating an example of one manufacturing process of the stator;

DETAILED DESCRIPTION OF EMBODIMENTS

Figure 1:
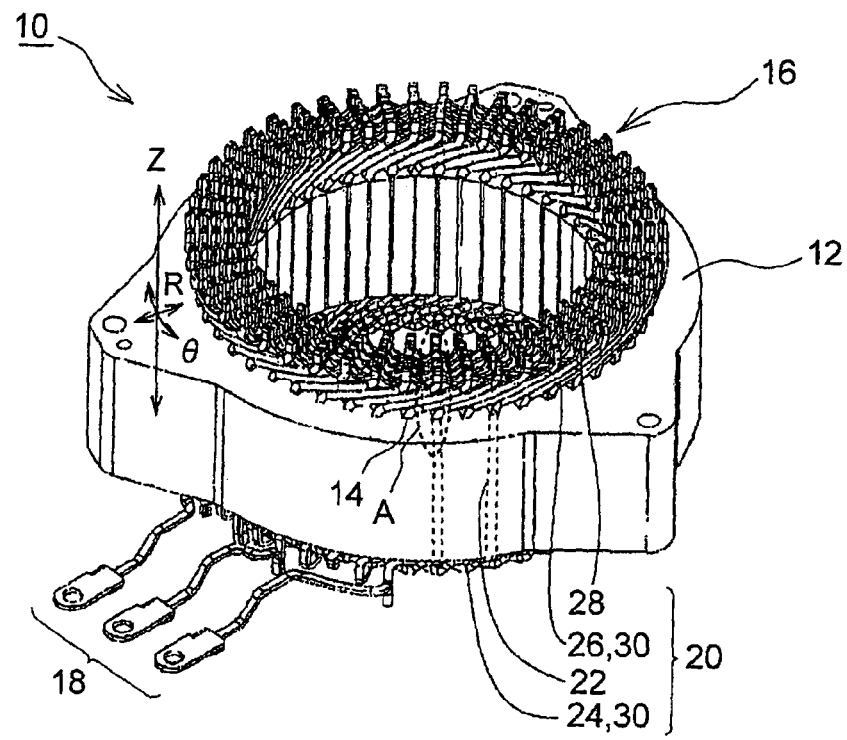
FIG. 1 is a view of the structure of a stator according to an example embodiment of the invention.

Hereinafter, example embodiments of the stator according to the invention will be described with reference to the accompanying drawings. FIG. 1 is a view of the structure of the stator according to a first example embodiment. The stator 10 of this example embodiment is used in a rotary electric machine that runs by being supplied with three-phase alternating current electricity.

The stator 10 includes a stator core 12, a stator coil 16 that is wound through slots 14 of the stator core 12, and various phase terminals 18 that are pulled out from the stator coil 16.

In FIG. 1, a Z direction indicates an axial direction of the stator core 12, a θ direction indicates a circumferential direction of the stator core 12, and a R direction indicates a radial direction of the stator core 12.

The stator coil 16 is a three-phase stator coil. The stator coil 16 of each phase is formed by a plurality of segment coils 20 being connected together. The segment coils 20 are conducting wires, each of which is formed in a U-shape so as to have two insertion portions 22 that are inserted into the slots 14, and a bridge portion 24 that extends between these two insertion portions 22. The stator coil 16 in this example embodiment is formed with the segment coils 20 wound in a distributed manner around the stator core 12. A distributed winding is a winding method in which the segment coils 20 are wound around the stator core 12 in such a manner that a segment coil 20 of one phase is inserted into two slots 14 that sandwich a slot 14 into which a segment coil 20 of another phase is inserted. The invention is not limited to this winding method. That is, a concentrated winding, i.e., a winding method in which a conducting wire is wound directly around the stator core 12 via an insulator, may also be used, as long as the segment coils 20 that are inserted into one slot 14 are all the same phase.

In FIG. 1, the bridge portion 24 is made to come out at an end portion on one side (i.e., a first end portion) in an axial direction Z of the stator core 12, and the insertion portions 22 on both sides of the bridge portion 24 are inserted into the slots 14. A tip end portion 26 of each insertion portion 22 that protrudes from an end portion on the other side (i.e., a second end portion) in the axial direction Z of the stator core 12 is connected by welding or the like to the tip end portion 26 of another segment coil 20. In FIG. 1, a weld 28 is shown. The weld 28 is an end portion of a very tip end of the tip end portion 26 of the segment coil 20. In the stator 10 of this example embodiment, the welds 28 of the segment coils 20 of each phase are all gathered on the other side (i.e., the second end portion side) of the stator core 12.

In this way, the bridge portions 24 of the segment coils 20 are arranged protruding on the end portion on one side (i.e., the first end portion) of the stator core 12, and the tip end portions 26 of the segment coils 20 are arranged protruding on the end portion on the other side (i.e., the second end portion). A portion where the segment coil 20 protrudes at the end portion of the stator core 12 will be referred to as a "coil end". The tip end portion 26 and the bridge portion 24 of the segment coils 20 are both positioned on portions that protrude from end portions of the stator core 12, so these portions will hereinafter be referred to as coil end portions 30. Coil ends of neighboring phases are offset a predetermined amount in the circumferential direction, and are arranged alternately in the radial direction.

Figure 2:
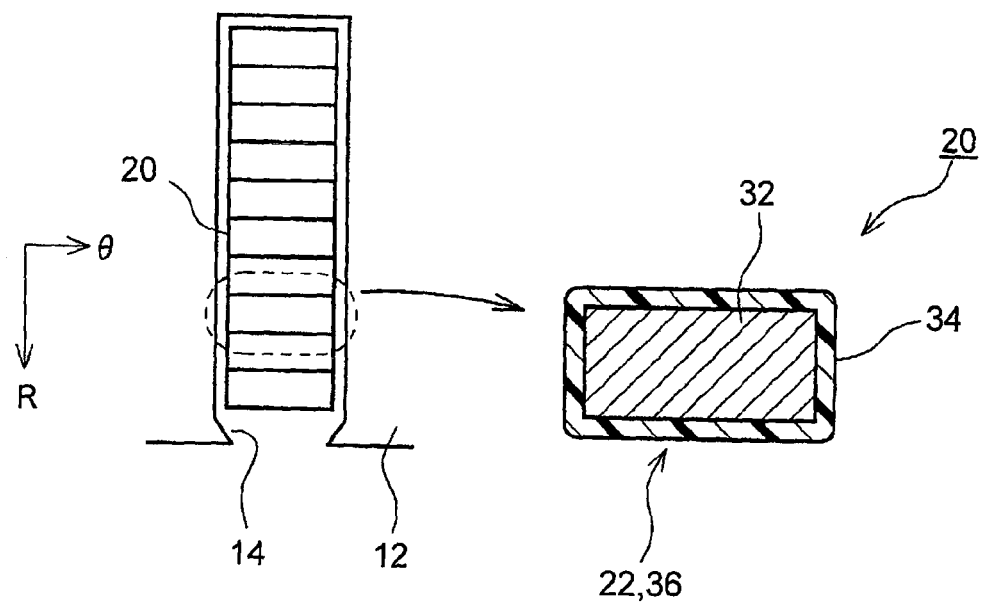
FIG. 2 is a sectional view of a slot in portion "A" in FIG. 1, cut on a plane parallel to an R-θ plane.

FIG. 2 is a sectional view of the slot 14 in portion "A" in FIG. 1, cut on a plane parallel to an R-θ plane. Ten segment coils 20 are arranged in each slot 14. The invention is not limited to the number of segment coils 20 arranged in one slot 14 being ten, i.e., the number of segment coils 20 that are arranged in one slot 14 may also be another number. The segment coils 20 in the slot 14 are portions of the insertion portions 22. FIG. 2 also shows an enlarged view of an insertion portion 22 of one segment coil 20. The segment coils 20 housed in one slot 14 form a same-phase stator coil 16.

Each segment coil 20 shown as an insertion portion 22 is formed by a so-called flat wire 36, which is conducting wire in which a conductor 32 having a rectangular cross-section is coated with an insulating layer 34. The conductor 32 is a metal wire member with high electrical conductivity. Copper, aluminum, silver, gold, or an alloy of these may be used as the material. For the insulating layer 34, a resin coating may be used, for example. A polyamide resin, an epoxy resin, an acrylic resin, or a urethane resin or the like may be used for the resin. Each segment coil 20 in this example embodiment is formed by one conductor 32, but the invention is not limited to this structure. A plurality of the conductors 32 may also be arranged parallel in the circumferential direction.

With each segment coil 20 in this example embodiment, an insulating layer of an adjacent portion 38 that is adjacent to a segment coil 20 of a different phase at the coil end portion 30 is thicker than a thin insulating layer in another region. As described above, the insulating layer of the adjacent portion 38 is thicker than the insulating layer in another region, so hereinafter this insulating layer will be referred to as a "thick insulating layer 34a" (see FIGS. 4 and 5). On the other hand, the insulating layer in the other regions is thinner than the thick insulating layer 34a, so hereinafter this insulating layer will be referred to as a "thin insulating layer 34b" to distinguish it from the thick insulating layer 34a (see FIGS. 4 and 5). Segment coils 20 of different phases being adjacent at the coil end portion 30 includes segment coils 20 of different phases contacting each other and being near each other.

The thickness of the thick insulating layer 34a at the adjacent portion 38 is a thickness that is able to ensure insulation performance in which insulation breakdown will not occur even at peak voltage of interphase voltage while the rotary electric machine is operating, i.e., is a thickness that ensures interphase insulation. The insulation performance required by this adjacent portion 38 is the greatest from among all of the regions of the segment coil 20. In other words, the insulation performance required at other regions, is lower than the insulation performance of the adjacent portion 38. By making the thickness described above only at the adjacent portion 38, the thickness of the thin insulating layer 34b in the other regions is able to be made thinner. For example, the thickness of the thin insulating layer 34b in the other regions is a thickness having insulation performance that takes into account the potential difference between segment coils 20 of the same phase, i.e., is a thickness that ensures intraphase insulation. By setting the thickness of the insulating layer according to this kind of required insulation performance, the overall insulating layer of the segment coil 20 is able to be made thinner, so the in-slot space factor of the stator coil 16 is able to be improved.

In this example embodiment, the thickness of the insulating layer is made thicker only at positions of the segment coil 20 that are adjacent to another-phase coil. In particular, an insulating layer that is thicker than at other portions is formed in a predetermined portion of the segment coil 20, before a plurality of the short segment coils 20 are connected (welded) together. That is, in a single insulating layer forming process, an insulating layer is formed changing the thickness at the portion. Therefore, this forming process is extremely efficient. Moreover, the segment coil 20 is formed by bending straight flat wire 36. Therefore, a better insulating layer is able to be formed by making the insulating layer thick at a predetermined portion of the straight flat wire 36 before bending.

Figure 3:
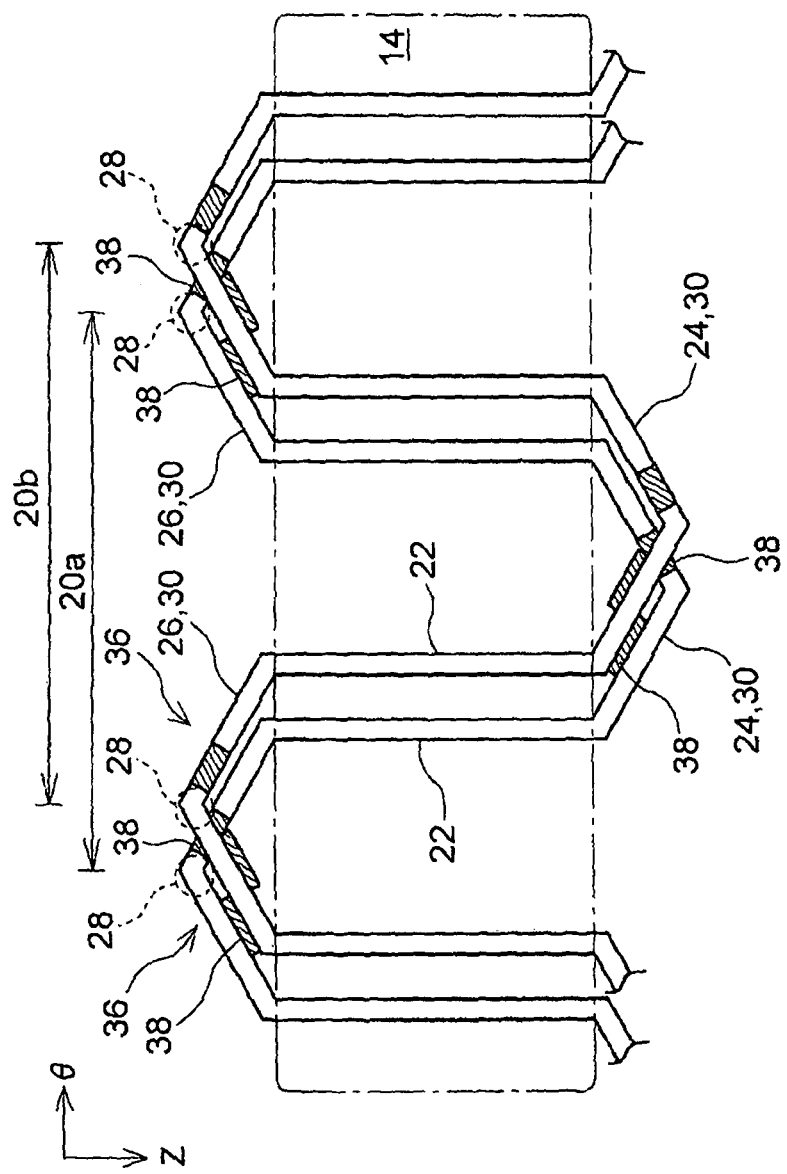
FIG. 3 is a view of the structure of a segment coil according to the example embodiment.
Figure 4:
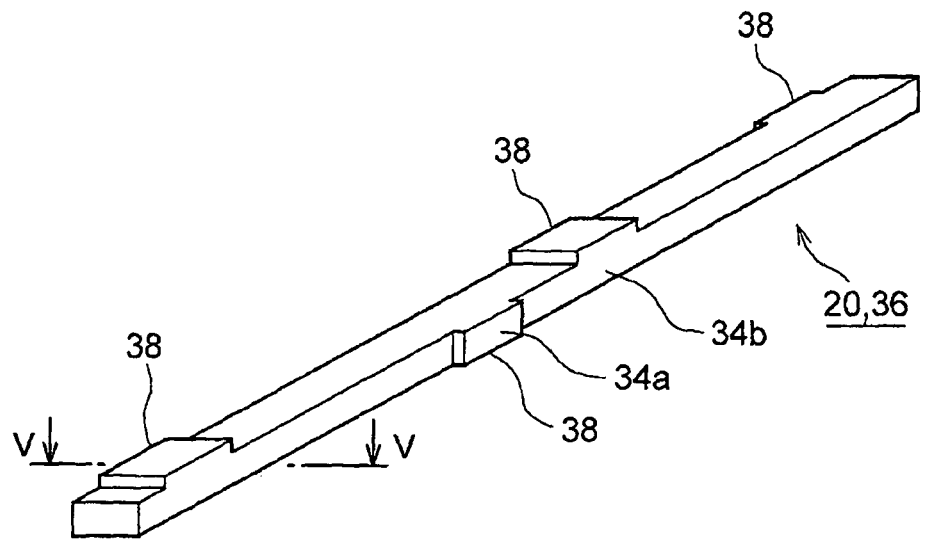
FIG. 4 is a view of the structure of the segment coil before bending.
Figure 5:
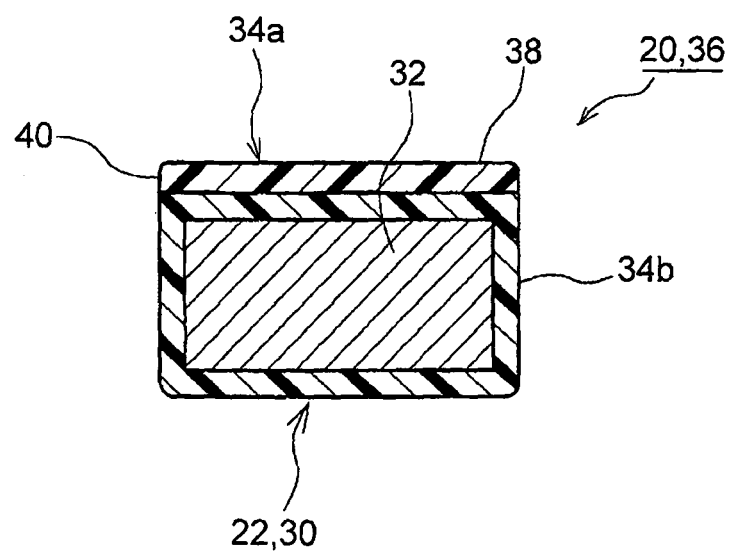
FIG. 5 is a sectional view taken along line V-V in FIG. 4.

Next, the structure of the segment coil 20 in this example embodiment will be described with reference to FIGS. 3 to 5. FIG. 3 is a view of the structure of the segment coil 20 according to the example embodiment. FIG. 4 is a view of the structure of the segment coil 20 before bending, and FIG. 5 is a sectional view taken along line V-V in FIG. 4.

The segment coil 20 is a U-shaped conducting wire formed by the tip end portions 26 that each have a weld 28 at the very tip end, the insertion portions 22, and the bridge portion 24, as described above. Same-phase segment coils 20 are wound in a distributed manner in the circumferential direction θ to form the stator coil 16. FIG. 3 is a view showing a segment coil 20a of a certain phase (e.g., a U-phase) and a segment coil 20b of another phase (e.g., a V-phase) in a state wound in a distributed manner.

Typically, in a three-phase stator coil formed by a distributed winding, a coil end portion exposed from a slot of one phase is arranged alternately with a segment coil of a different phase that is exposed from an adjacent slot, and these are adjacent, as described in JP 2011-72071 A. In FIG. 3, locations where different-phase segment coils are adjacent are indicated by areas of diagonal lines. The segment coil 20a has four adjacent portions 38 that are adjacent to the segment coil 20b at the coil end portion 30. Similarly, the segment coil 20b also has four adjacent portions 38 that are adjacent to a segment coil of a W1-phase, not shown, when the segment coil 20b is a U2-phase, for example. In this way, the shape of the coil end portion 30 is uniquely determined by forming the stator coil 16 with the segment coils 20, so the position of the adjacent portion 38 of each segment coil 20 is fixed. Because the position of the adjacent portion 38 is specified beforehand, it is easy to form the thick insulating layer 34a that is thick on only the adjacent portion 38 in a process for coating the conductor 32 with a resin layer.

FIG. 4 is a view showing a straight segment coil 20 before it is bent into a U-shape. The position of the adjacent portion 38 is specified, as described above, before the segment coil 20 is assembled to the stator core 12, and even before the segment coil 20 is bent into a U-shape. The adjacent portion 38 is provided in two locations on one surface of the segment coil 20 in this example embodiment, and the adjacent portion 38 is provided in one location on each of two side surfaces that are connected to this surface.

The thickness of the thick insulating layer 34a of the adjacent portion 38 is thicker than the thickness of the thin insulating layer 34b in the other regions, as shown in FIG. 5. In this example embodiment, first, the outer periphery of the conductor 32 is coated with the thin insulating layer 34b. Then, insulating material having even higher insulation performance than the thin insulating layer 34b is applied or dripped only on to the adjacent portion 38 to form the insulation-reinforcing insulating layer 40, thus forming the thick insulating layer 34a. By forming the thick insulating layer 34a after forming the thin insulating layer 34b in the insulating layer coating process in this way, the insulating layer is able to be formed efficiently. In particular, in this example embodiment, the segment coil 20 is the flat wire 36 having a rectangular cross-section, and each adjacent portion 38 is positioned on a flat surface, so the insulation-reinforcing insulating layer 40 is able to be easily formed on the thin insulating layer 34b.

In this example embodiment, the insulating layer is formed corresponding to the insulation performance required at each region of the segment coil 20. That is, the thick insulating layer 34a of the adjacent portion 38 that is adjacent to a different-phase segment coil 20 at the coil end portion 30 has a thickness that ensures insulation performance in which insulation breakdown will not occur even at peak voltage of interphase voltage while the rotary electric machine is operating. On the other hand, in the regions other than the adjacent portion 38, the insulation performance may be less than that required at the adjacent portion 38, so these regions are coated with the thin insulating layer 34b that is thinner than the thick insulating layer 34a. In this way, a high degree of insulation performance is ensured only at the adjacent portion 38 that is one portion of the segment coil 20. In addition, by making the insulating layer 34 in the other regions thinner, the in-slot space factor of the stator coil 16 is able to be improved while ensuring insulation performance. Also, at the coil end portion 30 as well, the insulating layer in regions other than the adjacent portion 38 is thin, so space can be saved at the coil ends of the stator coil 16, which enables the rotary electric machine to be made smaller.

Figure 6:
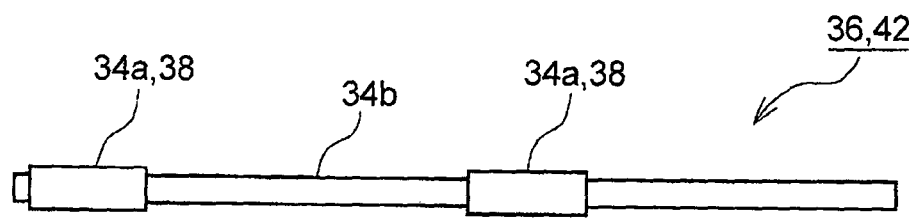
FIG. 6 is a view of the structure of the segment coil before bending.
Figure 7:
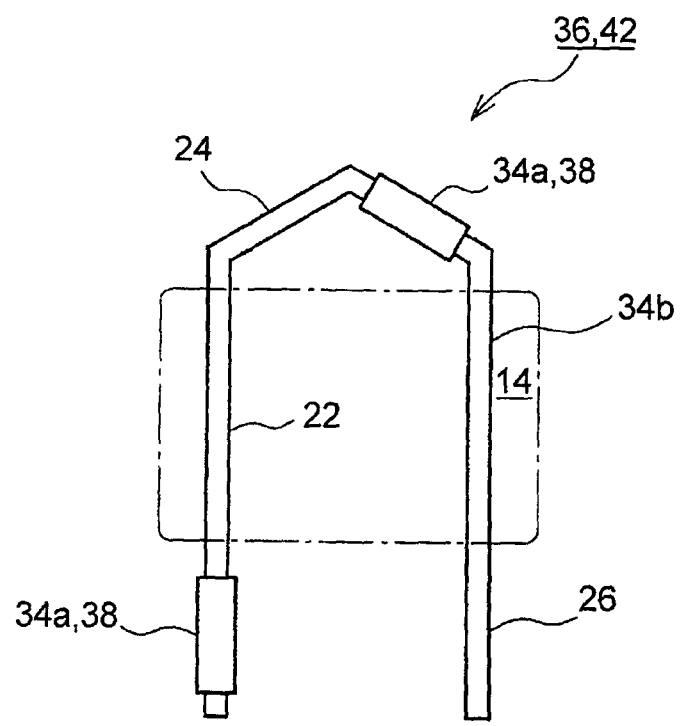
FIG. 7 is a view of the structure of the segment coil after bending.

Next, the structure of a segment coil 42 according to a second example embodiment of the invention will be described with reference to FIGS. 6 and 7. FIG. 6 is a view of the structure of the segment coil 42 before bending, and FIG. 7 is a view of the structure of the segment coil 42 after bending.

FIG. 6 is a view of the flat wire 36 in a shortened state in which a long conductor has been cut to a coil segment length. This flat wire 36 is in a state before being bent into the segment coil 42. Even before the segment coil 42 is bent into a U-shape, in this example embodiment as well, the position of the adjacent portion 38 is specified, as described above. Therefore, the specified adjacent portion 38 is coated with the thick insulating layer 34a, and the regions other than the adjacent portion 38 are coated with the thin insulating layer 34b that is thinner than the thick insulating layer 34a. The adjacent portion 38 is provided in two locations on the segment coil 42 in this example embodiment. Also, the flat wire 36 that is coated with the insulating layer 34 undergoes a bending process, in which it is bent from the shortened state into a segment coil shape, as shown in FIG. 7. Then the flat wire 36 is wound in a distributed manner around the stator core 12, thus forming the stator coil 16.

Conventionally, when coating a long conductor with an insulating layer, a continuous process of applying insulation coating resin, making the coating even, and baking is performed. During this process, a core conductor is fed out at a predetermined speed in a longitudinal direction of the conductor. In the application process resin is applied by dipping the conducting wire into a tank filled with resin, or by dripping resin onto the conducting wire, and then the conducting wire is passed through a die, where the coating thickness is adjusted and the coating is evened out. Also, in order to form a coating of a predetermined thickness, typically, the process from application to baking is repeated a plurality of times. With such a conventional insulating layer forming method, when an attempt is made to change the coating thickness at some parts, a process and equipment capable of pinpoint application must be newly added, and the continuously fed conductor must be stopped each time in this pinpoint application process, and the thickness of the coating must be changed only at the target portion (e.g., the adjacent portion 38). As a result, the manufacturing cost increases, and the manufacturing time increases, which is problematic. Also, there will be interference between the thick resin layer, and a bobbin for winding and a guide that supports the core conductor, so the thick resin layer will end up being shaved or peeled off, or the central line of the core will be difficult to establish and the target portion will be unable to be made the proper thickness, all of which are problematic.

In this example embodiment, the foregoing problems are solved by forming the insulating layer 34 that includes the thick insulating layer 34a and the thin insulating layer 34b after the conductor 32 has been cut from being long to the shortened state. That is, in the shortened state, the core conductor does not need to be fed in the longitudinal direction of the conductor, so the insulating layer can be applied while the core conductor is stopped. As a result, the thickness of the insulating layer is able to be changed at some parts, i.e., the thick insulating layer 34a is able to be made the proper thickness. Also, in the shortened state, the bobbin and guide of the core conductor are not necessary, so damage to the thick insulating layer 34a that is the thick portion can be avoided. Also, the shortened state makes transfer molding or injection molding using a die possible in the application process, so the insulating layer 34 having different thicknesses is able to be formed properly and easily.

Also, having the flat wire 36 be in the shortened state enables the insulating layer to be applied while the flat wire 36 is being rotated about the longitudinal axis of the conductor 32, which obviates the need for a die, and enables the thick insulating layer 34a to be formed. In this case, the thick insulating layer 34a is also formed on the other three surfaces that are the same regions as the adjacent portion 38 in the longitudinal direction of the conductor 32.

In this example embodiment, a case is described in which the insulating layer 34 is formed when the flat wire 36 in the shortened state, but the invention is not limited to this. The insulating layer 34 may also be applied i.e., formed, after the flat wire 36 has been bent into a segment coil shape. This inhibits the insulating layer 34 from being damaged in the bending process, and improves the uniformity of the coating at the bent portion, thus making it possible to inhibit the insulation performance from decreasing.

In this example embodiment, the same resin is used for both the thick insulating layer 34a and the thin insulating layer 34b of the insulating layer 34. Using the same material enables the same equipment to be used, as well as inhibits the manufacturing cost and work load from increasing. Also, because the material of the thick insulating layer 34a and the thin insulating layer 34b is the same and only the thickness of the coating is changed when forming the insulating layer 34, adhesion among different materials does not have to be taken into account, so the insulating layer 34 having good insulation performance and good adhesion is able to be formed.

In these example embodiments, a case in which three-phase alternating current electricity is supplied to the stator coil 16 is described, but the invention is not limited to this structure. That is, polyphase alternating current electricity, i.e., electricity of alternating current with a plurality of phases, may also be supplied to the stator coil 16.

In the first example embodiment, a case is described in which the insulation-reinforcing insulating layer 40 is material having higher insulation performance than the thin insulating layer 34b, but the invention is not limited to this structure. The insulation-reinforcing insulating layer 40 may of course also be formed by recoating with the same type of resin as that of the thin insulating layer 34b, as long as it is possible to ensure insulating performance in which insulating breakdown will not occur among the phases.

Also, in the first example embodiment, a case is described in which only the insulating layer of the adjacent portion 38 is the thick insulating layer 34a, but the invention is not limited to this structure. As described in the second example embodiment, the thick insulating layer 34a may also be formed on the other three surfaces as long as it is in the same region as the adjacent portion 38 in the longitudinal direction of the conductor 32.

Next, the manufacturing method of the stator 10 structured in this way will be described with reference to FIGS. 8 and 9A to 9D. FIG. 8 is a flowchart illustrating an example of one manufacturing process of the stator 10, and FIGS. 9A to 9D are views of the states of the conductor 32 and the flat wire 36 in each step in the process shown in FIG. 8. The flowchart in FIG. 8 illustrates in detail the manufacturing process of the stator coil 16 in particular. The manufacturing method of the stator core 12 is similar to that of the related art so a detailed description thereof will be omitted.

Figure 9A:
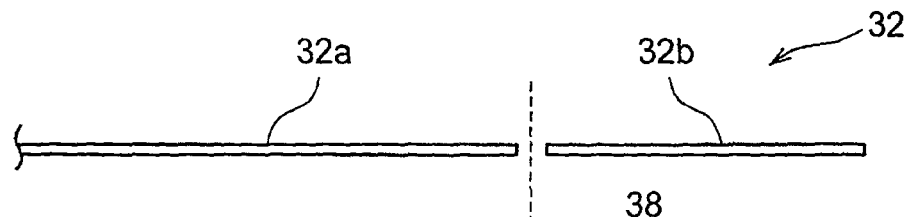
FIGS. 9A to 9D are views of the states of the conductor and the flat wire in each step in the process shown in FIG. 8.

First, in step S01, a long conductor 32a is cut to form a short conductor 32b. FIG. 9A shows this cut state. The length of short conductor 32b is the length of the segment coil 42 before the bending process, i.e., is the coil segment length.

Figure 9B:
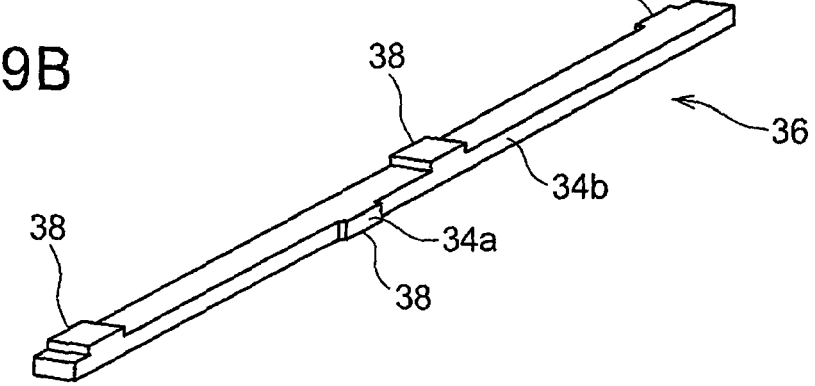
Figure 9C:
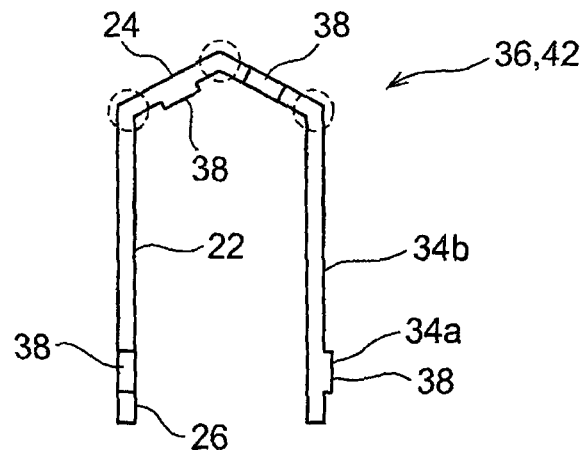
Figure 9D:
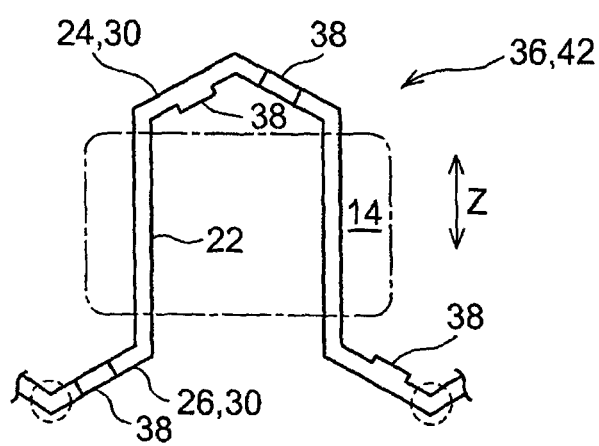

In step S02, the insulating layer 34 is applied to the short conductor 32b. At this time, the insulating layer 34 of the adjacent portion 38 of the coil end portion 30 is applied so as to be thicker than the thin insulating layer 34 in another region. More specifically, an epoxy resin or polyester resin or the like is applied to the outer periphery of the conductor 32b. Then the resin is heated and hardened to form the thin insulating layer 34b. Next, the same resin as that used for the thin insulating layer 34b, or resin having higher insulation performance than the thin insulating layer 34b, is applied or dripped only on to the adjacent portion 38. This resin is then heated and hardened to form the thick insulating layer 34a. It is by this process that the short flat wire 36, such as that shown in FIG. 9B, is formed. The position of the adjacent portion 38 is able to be specified beforehand, as previously described, even before the segment coil 20 is assembled to the stator core 12. Therefore, with the short conductor 32b as well, it is possible to easily form only the adjacent portion 38 with the thick insulating layer 34a that is thick.

Continuing on, the process advances on to step S03, where the conductor 32b having the insulating layer 34, i.e., the flat wire 36, is bent into a segment coil shape. On one flat wire 36, the bent portion is provided at three locations on the bridge portion 24 of the segment coil 42, as shown by the regions encircled by the broken lines in FIG. 9C. The bending radius of the inner peripheral side of these bent portions is 2.5 mm, for example. A jig, not shown, used in the bending process includes an inner peripheral side jig that has an outer diameter corresponding to the inner peripheral side of the bent portion, and that restrains this inner peripheral side, and outer peripheral side jigs that restrain both ends of the bent portion in the longitudinal direction of the flat wire 36 from the outer peripheral side of the bent portion. The bent portion is formed by making the flat wire 36 contact the inner peripheral side jig and pressing the flat wire 36 toward the inner peripheral side with at least one of the outer peripheral side jigs. The bending jig is not limited to the structure described above. A conventional jig may also be used.

Finally, in step S04, the flat wire 36 is wound around the stator core 12 to form the stator coil 16. More specifically, the bridge portion 24 is made to come out at an end portion on one side in the axial direction Z of the stator core 12, and the insertion portions 22 on both sides of the bridge portion 24 are inserted into the slots 14. A tip end portion 26 of each insertion portion 22 that protrudes from an end portion on the other side in the axial direction Z of the stator core 12 is then bent toward the outside in the circumferential direction. Then the end portion of each tip end portion 26 (i.e., the regions encircled by the broken lines in FIG. 9D) is connected by welding or the like to the end portion of the tip end portion 26 of another segment coil 20 of the same phase that is adjacent in the circumferential direction. Consequently, the stator coil 16 that is wound around the stator core 12 is formed, and the manufacturing process of the stator 10 ends.

This kind of manufacturing process differs from a conventional process such as that described earlier, in that the insulating layer 34 is formed after the conductor 32 has been cut to a short state. By cutting the conductor 32 to the short state in this way, the long core conductor does not need to be fed in the longitudinal direction of the conductor in the resin layer coating step, so the resin can be applied while the short core conductor 32b is stopped. As a result, the thickness of the insulating layer is able to be changed at some parts; i.e., the thick insulating layer 34a is able to be made the proper thickness and/or position. Also, by making the conductor 32 short before the resin layer coating process, the bobbin and guide of the core conductor are no longer necessary, so damage to the thick insulating layer 34a due to contact with these members can be avoided.

Figure 10:
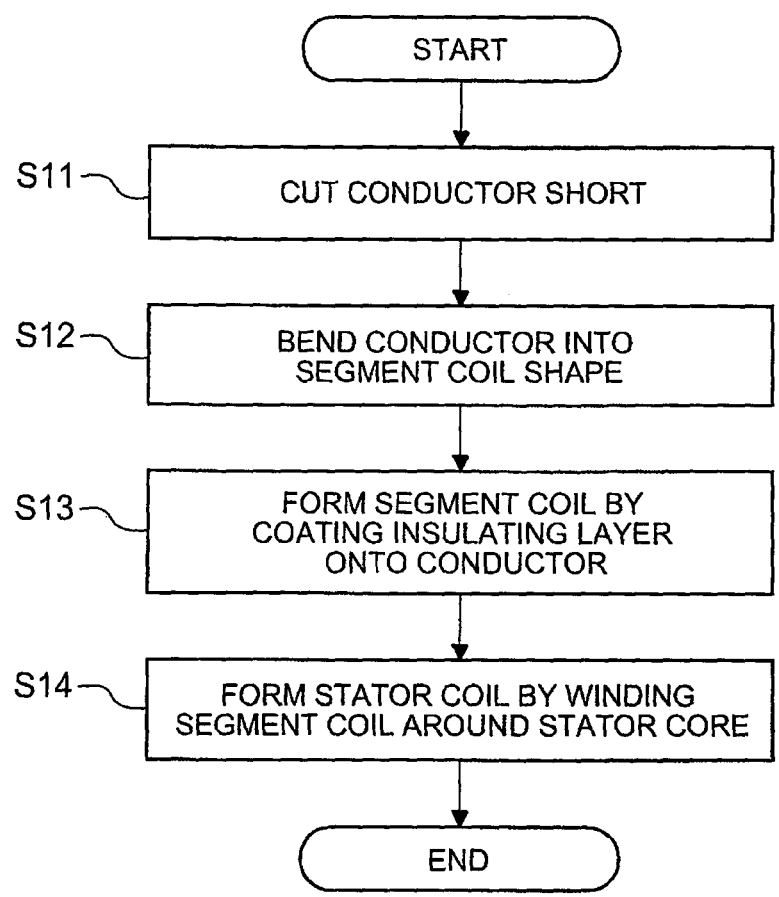
FIG. 10 is a flowchart illustrating an example of another manufacturing process of the stator.

In the manufacturing method of the stator 10 described above, a case in which the insulating layer 34 is formed before the conductor 32 is bent into the segment coil shape, but the invention is not limited to this manufacturing method. That is, a manufacturing method shown in FIGS. 10 and 11A to 11D, as will be described next, may also be employed. FIG. 10 is a flowchart illustrating an example of another manufacturing process of the stator 10, and FIGS. 11A to 11D are views showing the states of the conductor 32 and the flat wire 36 in each step in the process shown in FIG. 10.

Figure 11A:
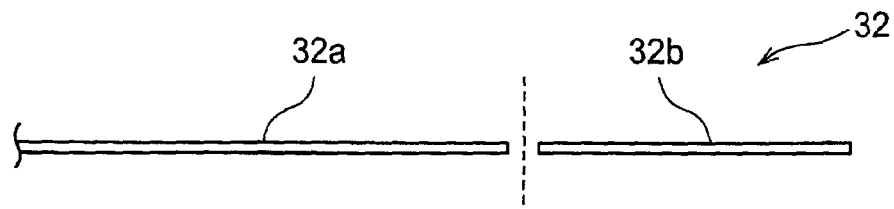
FIGS. 11A to 11D are views showing the states of the conductor and the flat wire in each step in the process shown in FIG. 10.
Figure 11B:
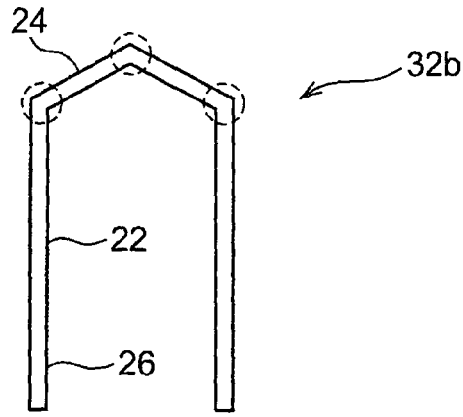
Figure 11C:
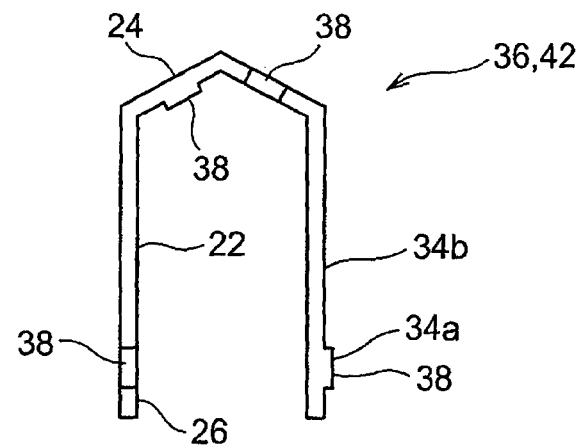

First, in step S11 in the flowchart shown in FIG. 10, the conductor 32 is cut in two to form a long conductor 32a and a short conductor 32b. FIG. 11A shows this cut state.

Then the process proceeds on to step S12, where the short conductor 32b is bent into a segment coil shape. The bent portion is provided at three locations on the bridge portion 24, as shown by the regions encircled by the broken lines in FIG. 11B.

Continuing on, in step S13, the insulating layer 34 is formed by applying resin to the segment coil-shaped conductor 32b. More specifically, the thin insulating layer 34b is formed on the outer periphery of the conductor 32b. Then, the thick insulating layer 34a is formed using the same resin as that used for the thin insulating layer 34b, or resin having higher insulation performance than the thin insulating layer 34b, only on to the adjacent portion 38. As a result, the segment coil-shaped flat wire 36, i.e., the segment coil 42, is formed.

Figure 11D:
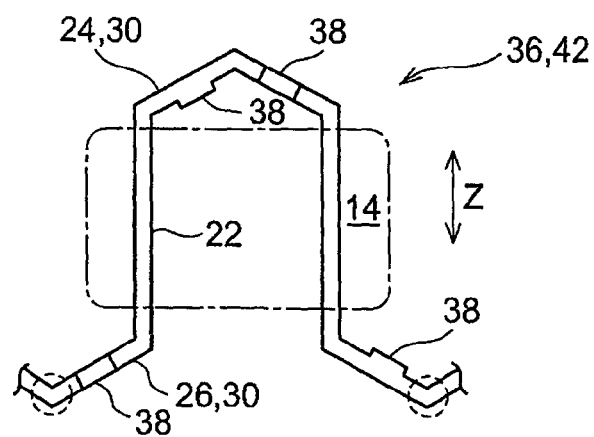

Finally, in step S14, the segment coil 42 is wound around the stator core 12 to form the stator coil 16 as is shown in FIG. 11D, and then this manufacturing process ends. The regions encircled by the broken lines in FIG. 11D are welding points for connecting the tip end portions 26 of adjacent segment coils 42 together, as described in the manufacturing process above.

As is shown in this flowchart, the insulating layer 34 is able to be coated on after the conductor 32b is bent. This inhibits the insulating layer 34 from being damaged in the bending process, and improves the evenness of the coating at the bent portion, thus making it possible to inhibit the insulation performance from decreasing.

In the resin layer coating processes of the two manufacturing processes described above, a case in which the insulating layer 34 is formed by applying resin to the conductor 32b is explained, but the invention is not limited to this coating method. A different coating method may be used as long as the insulating layer 34 of different thicknesses is able to be formed on the outer periphery of the conductor 32b. For example, electrodeposition or a vacuum evaporation may also be used. Also, the conductor 32b is in a short state of a predetermined length, and the position where the thick insulating layer 34a is formed is specified beforehand, so the insulating layer 34 can also be suitably formed by transfer molding or injection molding using a die or the like. Employing these molding methods enables the insulating layer 34 having different thicknesses to be formed properly and easily.

The invention claimed is:

1. A stator comprising:
a stator core in which slots are formed a predetermined distance apart in a circumferential direction; and
a polyphase stator coil formed by a first flat wire of a first phase and a second flat wire of a second phase that differs from the first phase, the first flat wire and the second flat wire being coated with an insulating layer, and the polyphase stator coil being wound around the stator core through the slots,
wherein the first flat wire and the second flat wire each have an insertion portion that is inserted into the slots, the first flat wire and the second flat wire each have a coil end portion that protrudes from an end portion of the stator core;
wherein the insulating layer of the first flat wire includes a first insulating layer and a second insulating layer, wherein the first insulating of an adjacent portion of the first flat wire is thicker than the second insulating layer of the first flat wire, the adjacent portion is a portion adjacent to the second flat wire at the coil end portion of the first flat wire, and the second insulating layer is in a region other than the adjacent portion and the other three surfaces in a same region as the adjacent portion in the longitudinal direction of the first flat wire; and
the first insulating layer is formed by applying or dripping insulation material,
wherein
the first flat wire is configured to be coated with the first insulating layer when the first flat wire is in a shortened state in which the first flat wire has been cut to a coil segment length.

2. The stator according to claim 1, wherein
the stator coil is formed by the first flat wire and the second flat wire being wound in a distributed manner around the stator core.

3. The stator according to claim 1, wherein
the stator coil is formed by a segment coil.

4. The stator according to claim 3, wherein
the first insulating layer is coated on when the first flat wire has been bent into a segment coil shape from the shortened state in which the first flat wire has been cut to the coil segment length.

5. The stator according to claim 1, wherein
the first insulating layer of the adjacent portion is formed by a basic insulating layer and an insulation-reinforcing insulating layer,
the basic insulating layer has an even thickness of insulation material and is formed over the entire first flat wire, and
the insulation-reinforcing insulating layer has higher insulation performance than the basic insulating layer and is added to the basic insulating layer at the coil end portion by applying or dripping.

6. A rotary electric machine comprising:
a rotor; and
a stator including:
a stator core in which slots are formed a predetermined distance apart in a circumferential direction; and
a polyphase stator coil formed by a first flat wire of a first phase and a second flat wire of a second phase that differs from the first phase, the first flat wire and the second flat wire being coated with an insulating layer, and the polyphase stator coil being wound around the stator core through the slots,
wherein the first flat wire and the second flat wire each have an insertion portion that is inserted into the slots, the first flat wire and the second flat wire each have a coil end portion that protrudes from an end portion of the stator core;
wherein the insulating layer of the first flat wire includes a first insulating layer and a second insulating layer, wherein the first insulating layer of an adjacent portion of the first flat wire is thicker than the second insulating layer of the first flat wire, the adjacent portion is a portion adjacent to the second flat wire at the coil end portion of the first flat wire, and the second insulating layer is in a region other than the adjacent portion and the other three surfaces in a same region as the adjacent portion in the longitudinal direction of the first flat wire; and
the first insulating layer is formed by applying or dripping insulation material,
wherein
the first flat wire is configured to be coated with the first insulating layer when the first flat wire is in a shortened state in which the first flat wire has been cut to a coil segment length.

7. A manufacturing method of a stator having a stator core and a polyphase stator coil, slots being formed a predetermined distance apart in a circumferential direction in the stator core, the polyphase stator coil being formed by a first segment coil of a first phase and a second segment coil of a second phase that differs from the first phase, the first segment coil and the second segment coil being coated with an insulating layer, and the polyphase stator coil being wound around the stator core through the slots,
the manufacturing method comprising:
providing the first segment coil and the second segment coil, each of the first segment coil and the second segment coil having an insertion portion that is inserted into the slots, and a coil end portion that protrudes from an end portion of the stator core;
coating the first segment coil with the insulating layer;
applying or dripping insulation material to an adjacent portion, such that a first insulating layer of the adjacent portion is thicker than a second insulating layer in a region other than the adjacent portion, and the adjacent portion being a surface adjacent to the second segment coil at the coil end portion of the first segment coil, and the second insulating layer being formed in a region other than the adjacent portion and the other three surfaces in a same region as the adjacent portion in the longitudinal direction of the first segment coil; and
forming the polyphase stator coil by winding the first segment coil and the second segment coil coated with the first and second insulating layers around the stator core, wherein
a conductor is made to be in a shortened state by being cut to a coil segment length;

the insulating layer is coated on the conductor in the shortened state; and the conductor coated with the insulating layer is bent into a segment coil shape to form the first segment coil.

* * * * *